United States Patent Office 2,829,115
Patented Apr. 1, 1958

2,829,115

ACTIVATED CARBON FOR HYPERSORBER APPLICATIONS

Raymond M. Bushong and Harold R. Cole, Fostoria, Ohio, assignors to Union Carbide Corporation, a corporation of New York No Drawing. Application September 13, 1954
Serial No. 455,786

3 Claims. (Cl. 252—421)

This invention relates to activated carbon, and to methods for the production thereof.

More particularly, this invention relates to activated carbon suitable for use in hypersorber processes. Such processes are essentially recovery procedures which permit the separation of light gases and vapors from lean gas streams by means of activated carbon. In processes of this type, the activated carbon is constantly in motion, and is elevated to the top of the hypersorber apparatus by means of a gas lift from which it is circulated downward through the hypersorber by gravity. Because of this moving bed motion, the activated particles undergo constant reduction in size, making it necessary that the activated carbon be hard, highly resistant to attrition, and highly adsorptive. Since carbon must be added continuously to compensate for physical and attrition losses, it is also necessary that a low cost carbon be employed.

Certain further limitations exist by reason of the cost and availability of the raw materials from which activated carbon is made. Among these is the comparatively low density of some forms of activated carbon, which results in reduced adsorptive capacity; which factor is particularly disadvantageous when the carbon particles are of appreciable size. Another limitation resides in the fact that one of the forms of activated carbon is produced from coconut charcoal, which is costly, non-uniform in quality, and, at times, of low attrition resistance. For the reasons hereinabove mentioned, the ideal product for hypersorber applications is a relatively inexpensive activated carbon of high density, high adsorptive capacity, high attrition resistance, which is uniform in quality and can be prepared from readily available materials.

It is the object of this invention to provide such an activated carbon.

In accordance with the invention, this object is attained by bonding and pelleting the blend of milled petroleum acid sludge coke flour and sulphur with a high melting point pitch, preferably heating in dry steam, optionaly adding lubricating oil while maintaining an atmosphere of dry steam, pelleting, crushing and activating by any suitable method.

An important step in the process herein disclosed is that of mixing, and three embodiments thereof based on thermal conditions are possible. In so called "hot" mixing the binder is softened to a low viscosity to coat and bond the carbon particles. In cold or warm blending the pitch or binder is simply blended with the powder and sulphur to get a homogenous mixture with melting of pitch occurring with friction during the pelleting operation. Blending may be performed in either a warm or cold mixer, preferably at 120° C. to 130° C. If the mix is cold, it must be passed through the pellet mill two or three times to create sufficient heat to melt the pitch and bond the mix into well formed pellets. By heating the mix in a mixer during blending to a temperature just under the softening point of the pitch, less demand is made on the pellet mill to supply heat to the mix, with the result that a single pass through the mill is sufficient. In warm mixing it is important to maintain the mixer temperature slightly below the softening point of the pitch used. If this temperature is exceeded, the pitch will soften and difficulty will be caused by the mix building up on the mixer blades.

Cold or warm mixing is made possible by using 7 to 18 parts of sulphur per 100 parts of fixed carbon in the sludge coke flour. Sulphur acts as a lubricant, eliminating the necessity for oil or other type of lubricant. At temperatures of 130° C. or less, steam protection against oxidation in the mixer also can be eliminated. Binder concentrations can be reduced from 33 to 35 pounds of 175° C. melting point pitch to less than 30 pounds per 100 pounds of fixed carbon in the flour. For cold or warm mixing it is essential that the pitch be milled to a flour; preferably about 60% through 200 mesh with all through 35 mesh. The range of mixing and pelleting conditions for each of the three embodiments follows:

TABLE I

| Mix Type | Parts by Weight | | | | | |
|---|---|---|---|---|---|---|
| | Cold | | Warm | | Hot | |
| | From— | To— | From— | To— | From— | To— |
| Final Mix Temperature, ° C. | Room Temp. | | 120 | 130 | 160 | 170 |
| Sludge Coke Flour, Parts Fixed Carbon | 100 | | 100 | | 100 | |
| Binder—175° C. M. P., C. T. Pitch, Parts/100 Parts Fixed Carbon in Flour | 28 | 32 | 28 | 32 | 30 | 35 |
| Sulphur—Parts/100 Parts Fixed Carbon in Flour | 7 | 18 | 7 | 18 | 7 | 18 |
| Oil Lubricant—Parts/100 Parts Fixed Carbon in Flour | 0 | 5 | 0 | 5 | 3 | 5 |
| Number of Passes Through Pellet Mill | 2 | 3 | 1 | 2 | 1 | 2 |

Because of the variation in fixed carbon in sludge coke, all weights in the above table are shown on the basis of fixed carbon in the sludge coke flour.

In the practice of the invention, the raw petroleum acid sludge coke is dried at a suitable temperature and milled to a flour. Elemental sulphur is added to the dried coke flour, a proportion which may range from about 7 parts to 18 parts by weight being added to about 100 parts of fixed carbon in the coke flour. This mixture is charged into a hot mixer and blended in an atmosphere of dry steam, which atmosphere is maintained throughout the mixing operation. High melting point pitch, which may be from either coal or wood distillation is added to the mixture in an amount which may range from 30 parts to 35 parts by weight to about 100 parts of fixed carbon in the coke flour, the mixing being continued until substantial blending is effected. Where necessary, lubricating oil is then added to the mixture in an amount which may range from about 3 parts to 5 parts by weight to about 100 parts of fixed carbon in the coke flour, the mixing being continued until substantial homogeneity of the mixture is assured. The final mix temperature may range from 160° C. to 170° C. The hot mixture is pelleted, crushed and the particles activated by any suitable method. The actual activation process may be $CO_2$ gas, steam and/or flue gas, etc.

Illustrative of the invention, the following is a description of a successful production of activated carbons.

Raw petroleum acid sludge coke was dried at approximately 200° C. and milled to a fineness of about 60% through 200 mesh. To about 100 pounds, on a fixed carbon basis of the dry sludge coke flour was added about 8.8 pounds of sulphur, the mixture being charged into a hot mixer, and blended for about 15 minutes. An atmosphere of dry steam was maintained in the mixer throughout the entire mixing operation. To the mixture was added about 35 pounds of 175° C. melting point pitch and the mixing continued until the mix temperature reached about 150° C. At this point about 5.1 pounds of lubricating oil was added and the mixing continued until the mix temperature reached about 165° C. The mix was discharged while still hot and passed twice through a roll type pellet mill. After cooling, the pellets were sized such that after activation the product contained a maximum of 5% on 12 mesh and a maximum of 5% through 28 mesh using Tyler Standard Screen Scale sieves. The sized particles were then activated with $CO_2$ in the conventional manner by heating for about 100 hours at about 1000° C.

Several tests, descriptions of which follow, were utilized to ascertain and demonstrate the superiority of the activated carbon of the invention, produced from sludge coke, with commercially available carbon made from coconut charcoal.

The activity test to which reference is made in the tables below determines the total amount of carbon tetrachloride which a given sample of carbon will pick up, and is expressed as the percentage of the weight of carbon sample tested. Dry air saturated with carbon tetrachloride at 0° C. is passed through a 10 centimeter bed of carbon in a tube until the carbon sample ceases to adsorb more carbon tetrachloride. The tube containing the carbon sample is immersed in a constant temperature water bath held at 25° C. When the carbon is completely saturated, it is removed from the machine and weighed. The weight in grams of carbon tetrachloride picked up, divided by the carbon weight in grams, multiplied by 100 is the percent activity.

The apparent density (vibrated) is a measure obtained by dividing the weight of carbon in grams by the volume of the same carbon in cubic centimeters when vibrated to refusal. In this test carbon is placed in a graduate and vibrated on an electric vibrator at a rate such as to give maximum settling, until the minimum volume is obtained.

Apparent density (loose pack or bulk).—This measure represents the weight of carbon in grams divided by its weight in cubic centimeters as determined from a graduate without any tamping or vibration to refusal.

Butane and ethylene activity.—These tests establish the optimum carbon flow rate through, for example, a hypersorber, and require test apparatus of special design.

In running this test, approximately 1000 cc. of carbon are placed in a steam jacketed cylinder and dried by heating the carbon with preferably 150 p. s. i. g. steam on the jacket while passing nitrogen through the carbon charge. The drying period is complete when a cool mirror placed in the nitrogen exhaust stream shows only a trace of cloudiness. After drying the carbon is removed and the bulk density determined. The empty cylinder is then purged of nitrogen by passing butane through it. The dried carbon is then replaced in the cylinder and butane passed through the carbon charge at a rate of $0.1 \pm 0.01$ cubic feet per minute until 0.8 of a cubic foot of gas is discharged from the cylinder. The volume of gas adsorbed is determined by two wet test meters, one located ahead of the carbon and the other in the discharge line from the carbon. The volume of gas passed into the carbon minus the gas discharged from the carbon is the volume of gas adsorbed. To obtain the actual amount of gas adsorbed, corrections for gas and carbon temperature and gas pressure, and a factor for the particular gas used must be applied in the calculation.

The butane or ethylene activity is expressed in cc. of liquid butane or ethylene/cc. of activated carbon. It is also sometimes expressed as cc. of butane or ethylene/gm. of carbon as determined from the carbon bulk density.

Attrition loss.—The percentage loss in weight of carbon after completing 2000 cycles gives a numerical indication of the attrition or abrasion resistance of the carbon on test.

In running the tests, approximately 2000 cc. of dried and weighed carbon are placed in the attrition testing apparatus. The carbon is circulated through the system for 2000 cycles. The air for lifting the carbon from the bottom to the top of the unit is set at a flow rate of 17.5 cfm. After 2000 cycles through the system the carbon is removed and again dried. Dust and fine particles resulting from attrition are collected and screened over a 35 mesh Tyler standard sieve. The on 35 mesh is added to the above carbon removed from the system. After drying, the carbon is weighed again and the loss in percent calculated. This is the attrition loss figure.

TABLE II

| Raw Material | Sludge Coke | Coconut | Coconut |
|---|---|---|---|
| Carbon Properties: | | | |
| Activity, percent | 86.7 | 85.0 | 80.0 |
| Apparent Density— | | | |
| Vibrated | .500 | .465 | .490 |
| Loose Pack | .410 | .380 | .410 |
| Butane Activity, cc./g | .500– .499 | .496– .495 | .458–.456 |
| Ethylene Activity, cc./g | .215– .216 | .239– .228 | .202–.187 |
| Attrition Loss, percent | 7.3—7.4 | 7.4—8.4 | 9.9 |

It will be seen from the foregoing data that the activated carbon of the invention is superior in density for a given activity and shows greater resistance to attrition than activated carbon made from coconut charcoal.

Another example of the invention demonstrating increased carbon activity is as follows; in this example the treatment was the same as previously set forth, but with the components varied as shown:

140 lbs. sludge coke flour ____ 140 lbs. coconut charcoal flour.
39 lbs. 175° C. M. P. coal tar pitch ____ 34 lbs. 30 medium coal tar pitch.
9.7 lbs. sulphur ____ 0 lb. sulphur.
Percent activity—87 percent ____ 59 percent.

It will be seen from the above data that the use of sulphur in accordance with the invention increases the activity.

In another series of tests demonstrating the success of the invention, three different mixes were made. Mix A contained 400 pounds of sludge coke flour and 175 pounds of 175° C. melting point coal tar pitch in flake form; mix B contained 400 pounds of sludge coke flour and 154 pounds of 135° C. melting point hard wood pitch in lump form; mix C contained 120 pounds of sludge coke flour and 34 pounds of 175° C. melting point coal tar pitch in milled form (100% through 35 mesh). The amount of sulphur was varied in each of the mixes. After activation, each product was tested for activity, retentivity, apparent density and attrition loss. Test results are reported in Table III below.

TABLE III

| Mix | A | | | B | | | C | | |
|---|---|---|---|---|---|---|---|---|---|
| Sludge Coke Flour, Lbs | 400 | | | 400 | | | 120 | | |
| Sludge Coke Flour—Fixed Carbon, Lbs | 347 | | | 347 | | | 96 | | |
| Binder, Type | (1) | | | (2) | | | (1) | | |
| Binder, Lbs | 170 | | | 154 | | | 34 | | |
| Binder, Lbs./100 Fixed Carbon in Flour | 49.0 | | | 44.4 | | | 35.1 | | |
| Sulphur, Lbs | 8.5 | 18.7 | 35.7 | 9.2 | 18.5 | 35.4 | 8.5 | 16.9 | 25.4 |
| Sulphur, Lbs./100 Lbs. Fixed Carbon in Flour | 2.5 | 5.4 | 10.3 | 2.7 | 5.3 | 10.2 | 8.8 | 17.6 | 26.3 |
| Activated Carbon Properties: | | | | | | | | | |
| Activity, Percent | 90 | 87 | 103 | 71 | 77 | 85 | 76 | 88 | 89 |
| Retentivity, Percent | 27.4 | 29.7 | 33.9 | 25.0 | 28.6 | 29.9 | 42.1 | 45.1 | 44.8 |
| Vib. A. D | .381 | .396 | .380 | .412 | .407 | .411 | .562 | .510 | .487 |
| Attrition Loss | 17.1 | 15.5 | 11.7 | 16.9 | 15.2 | 11.7 | 6.5 | 8.0 | 7.7 |

1 175° C. M. P., coal tar pitch.
2 135° C. M. P., hardwood pitch.

Mixes A and B show low retentivities and densities as well as high attrition losses because of poor mixing conditions. These two mixes were mixed to a final temperature of 160° C. to 170° C. with no steam protection in the mixer. Because of the flake and lump pitch, poor distribution of the mix components was achieved, and oxidation of the mix resulted.

Mix C was made by the cold blend process in which no heat was applied to the mix. The coke flour milled pitch and sulphur was simply blended in a cold bread-type mixer for 20 minutes, after which 3.45 pounds of oil lubricant were added. The mix was blended an additional ten minutes after adding the oil, and then passed through the pellet mill three times. The addition of oil lubricant, while not essential to the process, is helpful.

It will be seen from Table III that increased amounts of sulphur increase the activity and reduce the attrition loss level for any given activity. The greatest increase in activity is obtained with a sulphur content of 18 to 20 pounds per 100 pounds of fixed carbon in the sludge coke flour present in the mix. It will also be noted that approximately 9 pounds of sulphur per 100 pounds of fixed carbon in the flour produces maximum reduction in attrition loss. It is also apparent from the above table that coal tar pitch having a melting point of 175° C. produces a slightly lower attrition loss carbon than does the 135° C. melting point hard wood pitch.

While emphasis has been placed upon the use of the activated material subject of this invention in hypersorber processes, other applications and uses thereof will be readily apparent to those skilled in the art, for example, uses wherein a comparatively large particle size activated carbon is desirable, since it is extremely difficult to activate large carbonaceous particles without the sulphur treatment described above.

What is claimed is:

1. The method of producing activated carbon of high density, large particle size, and high adsorptive capacity, which method comprises mixing in a vessel having heating means, petroleum acid sludge coke flour and sulphur in a proportion by weight on a fixed carbon basis, from about 100 to 110 parts of said sludge coke to about 9 parts of sulphur; heating said mixture to not more than 130° C., adding thereto from about 33 to 36 parts by weight of a binder selected from the group consisting of coal tar pitch and wood tar pitch; heating said mixture to not more than 170° C.; pelleting and crushing said mixture prior to activating the resulting particles.

2. The method of producing activated carbon of high density, high adsorptive capacity and high attrition resistance, which method comprises mixing petroleum acid sludge coke flour and sulphur in a proportion by weight, on a fixed carbon basis, from about 100 to 110 parts of said sludge coke to between 7 and 18 parts of said sulphur, heating said mixture to not more than 130° C., adding to said mixture from about 33 to 36 parts by weight of a binder selected from the group consisting of coal tar pitch and wood tar pitch, heating said mixture to not more than 170° C.; pelleting and crushing said mixture prior to activating the resulting particles.

3. The method of producing activated carbon, which method comprises mixing in an atmosphere of substantially dry steam about 100 parts by weight on a fixed carbon basis of petroleum acid sludge coke flour with about 8 parts sulphur, heating said mixture not less than 10 minutes at a temperature not above 130° C.; adding to said mixture about 33 parts of a binder selected from the group consisting of a high melting point coal tar pitch and a high melting point wood tar pitch; continuing said mixing and said heating to a temperature of not more than 160° C.; adding to said mixture about 4 parts lubricating oil and continuing said mixing and said heating to a temperature of not more than 170° C.; maintaining said atmosphere of substantially dry steam throughout said mixing and said heating; pelleting and crushing said mixture and activating said particles.

References Cited in the file of this patent

UNITED STATES PATENTS

| | | |
|---|---|---|
| 1,777,943 | Threlfall | Oct. 7, 1930 |
| 1,819,314 | Zurcher | Aug. 18, 1931 |
| 1,925,438 | Faben | Sept. 5, 1933 |
| 2,234,769 | McCulloch | Mar. 11, 1941 |
| 2,362,463 | Boehm et al. | Nov. 14, 1944 |
| 2,585,454 | Gamson | Feb. 12, 1952 |
| 2,648,637 | Rodman | Aug. 11, 1953 |